United States Patent Office 3,236,029
Patented Feb. 22, 1966

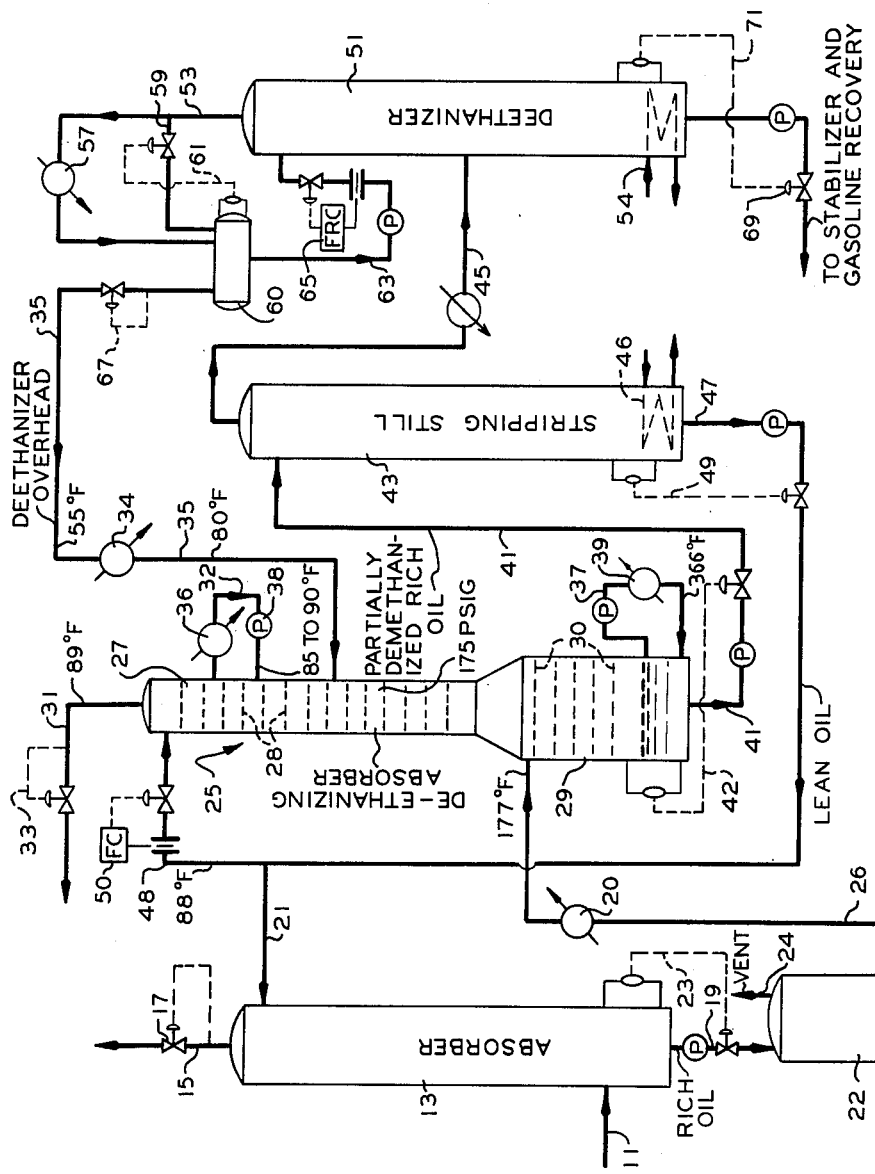

3,236,029
RECOVERY OF HYDROCARBONS
Ronald L. Afdahl, Alvin, Tex., and Charles G. Mitchell, Oklahoma City, Okla., assignors to Phillips Petroleum Company, a corporation of Delaware
Filed Oct. 15, 1962, Ser. No. 230,388
3 Claims. (Cl. 55—44)

This invention relates to recovery of hydrocarbons. In one aspect it relates to increasing recovery of propane from the overhead gas stream of a deethanizer still without need for use of a propane-ethane fractionating column.

In the separation and recovery of condensable hydrocarbons from natural gas containing them, an absorption-stripping process is frequently employed. The condensable hydrocarbons have numerous uses, for example, mixtures boiling within the gasoline boiling range are used in blending motor fuels. Others having too high vapor pressure for use in motor fuels in high concentrations such as butane and propane form the basis for the liquefied petroleum gases.

Separation of some of the lower boiling hydrocarbons from one another by fractional distillation is a very difficult procedure. Fractional distillation is not as efficient a means for separating these low boiling hydrocarbons from one another as it is for separating higher boiling hydrocarbons from one another, such as for instance heptane from hexane.

The use of deethanizing absorbers is conventional. We have found, however, that a stream containing propane and lower boiling hydrocarbons, mainly ethane, can be treated for propane elimination prior to disposal of a lower boiling hydocarbon by introduction of the stream into about the middle, vertically, of the absorbing section of a deethanizing absorber. This procedure eliminates the need for provision of an additional fractional distillation column to separate and recover propane from the propane-ethane mixture. It is preferable to add the propane-ethane vaporous stream to the deethanizing absorber column at a level well above the normal level of introduction of rich absorber oil so as not to cause the lower portion of the absorbing section to be overloaded as regards vapor load.

To our knowledge the vapor or gas stream containing ethane and propane with a very minor amount of methane has not ever been introduced onto about the middle tray of the absorbing section of a deethanizing absorber as a second feedstock. The origin of this vapor or gas stream is immaterial. It can originate as a separate stream at some remote and extraneous process point, or it can originate as a reflux accumulator gas from a deethanizing column.

An object of this invention is to provide a process and apparatus for eliminating a large portion of the propane content of the overhead gas from a deethanizing absorber. Another object of this invention is to provide apparatus and a process for the recovery of propane from a deethanizer overhead gas without need for use of a separate fractional distillation column. Still another object of this invention is to provide apparatus and a method for increasing the propane recovery of a deethanizer column overhead gas and increasing the recovery of said propane in the kettle product of the deethanizing column without need for use of a separate and individual ethane-propane fractionating column. Still other objects and advantages of this invention will be realized upon reading the following description which, taken with the attached drawing, forms a part of this specification.

The drawing illustrates, in diagrammatic form, an arrangement of apparatus parts for carrying out the process of this invention.

In reference to the drawing, reference numeral 11 identifies a conduit through which a natural gas is passed, from a source not shown, into the lower portion of an absorber column 13. The lean absorption oil, such as a mineral seal oil, is introduced into the upper portion of the column through a conduit 21. The absorption oil flows downwardly through the column in countercurrent relation to the upward flowing natural gas. The operation of such absorption columns is well understood in the natural gasoline extraction art. The portion of the natural gas evading absorption is passed from the absorber through an off-gas conduit 15 for such disposal as desired. A back pressure regulator 17 is provided for maintenance of proper pressure within absorber 13. A conduit 19 leads from the lower portion of the absorber for removal of the rich absorption oil. This rich absorption oil is flashed into tank 22, mainly for methane removal, with flashed vapors exiting via conduit 24 for such disposal as desired. Flashed oil is withdrawn via conduit 26, heated in a heater 20 and the heated oil is passed into the upper portion of the stripping section 29 of a deethanizing absorber 25. This deethanizing absorber comprises two main portions, an upper or absorbing section 27 and the lower or stripping section 29. As mentioned, the heated, rich absorption oil is introduced into the upper portion of the stripping section. A portion of the lean absorption oil stream not passed through conduit 21 is passed through a conduit 48 into the upper portion of the absorber section. A rate of flow controller 50 is provided in conduit 48 for regulation of the rate of flow of the lean absorption oil therein. This lean absorption oil flows downwardly in countercurrent relation to upflowing gases originating in the rich absorption oil. Since heat of absorption is exothermic a portion of the absorption oil near the upper end of the absorber section 27 is withdrawn through a conduit 32, is cooled in cooler or heat exchanger 36, and reintroduced into the absorber section below its removal point. A pump 38 provides for the flow through this conduit. This absorber section is provided with vapor-liquid contact promoting apparatus such as bubble cap trays 28 or the like. Similarly, the lower or stripper section of the column also is provided with vapor-liquid contact promoting trays such as trays 30.

At about a mid-level vertically of the absorber section 27 a stream of gas rich in ethane and propane and containing a minor proportion of methane is introduced by way of a conduit 35.

The rich absorption oil, heated in heater 20, upon being introduced into the stripping section 29 flash vaporizes to such an extent that large volumes of vapors are liberated and passed upwardly into the absorbing section. The unvaporized portions of the rich absorption oil flow downwardly over trays 30 in countercurrent relation to upflowing gases originating in the kettle section of this portion of the column. A portion of the absorption oil is passed through a conduit 37, is heated in heater 39, as a reboiler, and is reintroduced into the kettle section of the column for providing stripping vapors. These liberated vapors from the kettle section pass upwardly and strip other hydrocarbons from the absorption oil and the unabsorbed vapors leave the stripping section and enter the lower portion of the absorption section for countercurrent contact with the downflowing absorption oil from conduit 48.

The deethanized absorption oil leaves the stripping section 29 by way of a conduit 41 and is passed into the upper portion of a stripping still 43.

Coil 46 provides reboiling heat for the kettle section of this stripping still and in this still substantially all of the absorbed hydrocarbons, not removed in the deethanizing absorber, are removed from the absorption oil. The kettle product of still 43 is the lean oil of the absorption operation and this oil is passed through a conduit 47 and through a heat exchanger and cooling system, not shown, with the stream being divided and a portion passed by way of conduit 21 into absorber 13 and the remainder being passed through conduit 48 into the upper portion of the absorbing section 27.

The stripped gases leave the stripping still through a conduit 45 and are introduced into about the mid-section of a deethanizer tower 51. In this tower it is intended to remove as much of the ethane as practical from the feed to this column. Reboiling heat is provided for this column through a reboiler coil 54 and the kettle product of this column passing through a conduit 69 is a gasoline, and is the main product of the operation. A liquid level controller apparatus 71 is provided for regulation of the rate of withdrawal of the raw natural gasoline from this deethanizer column.

A liquid level controller apparatus 49 is provided in conjunction with the stripping still 43 for regulation of the rate of withdrawal of the lean absorption oil therefrom.

As is known in the deethanizing art a deethanizing column overhead product contains in addition to ethane some propane and also any methane which inadvertently is carried overhead from the stripping step. Since propane is an important marketable product, as much propane as possible is desired to be recovered from this deethanizer overhead stream. The deethanizer overhead vapors are passed through a conduit 53, reflux condenser 57 with condensate and uncondensed gases passing on into a reflux accumulator 60. It is intended that only sufficient condensate be produced in condenser 57 to reflux the deethanizer 51. The condensate from accumulator 60 passes through a conduit 63 with the flow being regulated by a rate of flow controller 65. A bypass conduit 59 bypasses condenser 57 and this bypass conduit contains a motor valve operated in response to a liquid level controller apparatus 61 in the reflux accumulator 60. Thus, as the level of condensate in accumulator 60 drops, the liquid level controller actuates the motor of the valve in bypass conduit 59 to throttle the valve somewhat so as to pass more of the overhead gases from conduit 53 to the condenser 57. In case the liquid level rises then the controller opens the motor valve in bypass conduit 59 to allow more of the deethanizer overhead vapors to bypass the condenser so as to produce less condensate. A back pressure regulator 67 is provided in the off-gas conduit 35 from the accumulator 60 in order to regulate the pressure in the deethanizer.

The off-gases from the deethanizing absorber 25 pass from the upper portion of the absorbing section through a conduit 31 with pressure being regulated by a back pressure regulator 33.

A heat exchanger 34 is provided as a heater in conduit 35 to add some heat to the gases flowing therethrough so as not to chill unduly the liquid and gases in process at the level of introduction of the vapors from conduit 35 into the absorbing section 27.

A liquid level controller 23 is provided in the lower portion of the absorber 13 to regulate the passage of the rich absorption oil through conduit 19. In like manner a liquid level controller 42 is provided in the kettle of the stripping section 29 to regulate the flow of the deethanized absorption oil through conduit 41.

In one operation a rich mineral seal absorption oil passing through conduit 19 is heated by heater 20 to a temperature of about 177° F. and then is introduced into the upper portion of an absorber section 29. The reboiler temperature is about 366° F. The lean absorption oil is passed into the upper portion of the absorbing section 27 through conduit 48 at a temperature of about 88° F. Off-gas from the absorbing section is passed by way of the conduit 31 at a temperature of about 89° F. The intercooler portion of this absorbing section cools a portion of the downflowing absorption oil to a temperature somewhere between 85° and 90° F. The heat exchanger 34 in this case ordinarily is operated as a heater and raises the temperature of the deethanizer accumulator off-gases from a temperature of about 65° to about 80° F., at which temperature the gases are introduced into the mid-section vertically of the absorber section. Pressure in the deethanizer-absorber is maintained at approximately 175 p.s.i.g. (pounds per square inch gauge).

In order to obtain a condensation temperature of about 55° F., the condenser 57 is ordinarily of a refrigeration type, such as a propane or an ethane refrigerant system.

| Stream No. | Stream No.—Mol Percent | | | | | | |
|---|---|---|---|---|---|---|---|
| | 19 | 35 | 41 | 31 | 45 | 21 | 48 |
| Component: | | | | | | | |
| $C_1$ | 29.4 | 2.8 | .1 | 69.0 | .1 | -------- | -------- |
| $C_2$ | 11.5 | 68.3 | 5.2 | 23.4 | 5.2 | -------- | -------- |
| $C_3$ | 21.6 | 26.7 | 31.8 | 7.5 | 31.8 | -------- | -------- |
| $C_4$ | 23.4 | -------- | 39.4 | -------- | 39.4 | -------- | -------- |
| $C_5$ | 7.2 | -------- | 12.0 | -------- | 12.0 | -------- | -------- |
| $C_6$ | 4.1 | -------- | 6.9 | -------- | 6.9 | -------- | -------- |
| $C_7+$ | 2.7 | -------- | 4.5 | -------- | 4.5 | -------- | -------- |
| $CO_2$ | .1 | 2.1 | .1 | .1 | .1 | -------- | -------- |
| | 100.0 | 99.9 | 100.0 | 100.0 | 100.0 | -------- | -------- |
| Liq. Bbl./day | 7,748 | 167 | 5,505 | 2,409 | 5,505 | | |
| MSO-Bbl./day | 35,714 | -------- | 41,064 | -------- | -------- | 30,364 | 5,350 |

The above tabulation illustrates stream compositions at various points of the flow diagram of the drawing. These stream compositions are given in terms of mol percent of absorbable hydrocarbons on an absorption oil-free basis. For example, the rich absorption oil flowing through conduit 19 contains the absorbed hydrocarbons and a very minor amount of carbon dioxide given in the tabulation in the column headed by numeral 19. It is noted that the deethanizer accumulator vapors passing through conduit 35 contain 68.3 mol percent ethane and 26.7 mol percent propane and only 2.8 mol percent methane. The combined off-gas from the deethanizing absorber passing through conduit 31 is noted to contain 69 mol percent methane, 23.4 mol percent ethane, and 7.5 mol percent propane. Thus, the off-gas passing through conduit 31 contains a much less proportion of propane than does the deethanizer accumulator off-gases.

As will be realized by those skilled in the art, these pressures and temperatures given hereinabove can be varied within limits depending upon the composition and the flow rates available of the materials in process. Thus, it may be desirable in some cases to maintain the deethanizing absorber pressure at 170 to 180 or even at a higher pressure than the hereinabove given 175 p.s.i.g. The particular operating conditions of stripping still 43 and of deethanizer 51 are not given herein because the operation of such equipment is well understood by those skilled in the art. Many gasoline extraction plants employ such equipment and their operations are well understood.

In the lower portion of the above tabulation are given the liquid barrels per day of the combined hydrocarbons and carbon dioxide mentioned in the previous portion of the tabulation. Thus, the rich absorber oil issuing from the absorber 13 contains 35,714 barrels per day of mineral seal oil and the composition of the absorbed materials in this rich absorber oil is given in the tabulation in the column headed by the reference numeral 19.

While certain embodiments of the invention have been described for illustrative purposes, the invention obviously is not limited thereto.

That which is claimed is:
1. A process comprising the steps of:
 (1) contacting natural gas with lean absorption oil and absorbing condensible hydrocarbons including propane and heavier hydrocarbons and unavoidably absorbing methane and ethane;

(2) heating the resulting rich oil and passing same into an upright stripping zone leading directly into and continuous with an overhead absorption zone and stripping principally ethane and methane vapors along with heavier hydrocarbons absorbed in step (1) and passing the stripped vapors directly into said absorption zone;

(3) heating the lower section of the stripping zone of step (2) and further stripping said oil of ethane and heavier hydrocarbons and causing stripped hydrocarbon vapors to ascend directly into the bottom of absorption zone of step (2);

(4) passing lean oil downwardly thru the absorption zone of step (2) and absorbing principally said heavier hydrocarbons and passing the resulting rich oil directly into said stripping zone and stripping ethane therefrom;

(5) introducing into the absorption zone of step (2) at a level adjacent the mid-section thereof a stream composed principally of ethane and propane and lean in methane substantially at absorption zone temperature and absorbing most of the propane therefrom in the adsorption oil and passing most of the ethane overhead with the overhead stream of step (2); and (6) recovering deethanized absorption oil rich in $C_3$ to $C_7$ and heavier hydrocarbons from the bottom of the stripping zone of step (2) as a product of the process.

2. The process of claim 1 including the steps of:

(7) stripping the deethanized rich absorption oil from step (6) of most of the absorbed hydrocarbons and separately recovering lean absorption oil and said hydrocarbons;

(8) recycling the lean absorption oil of step (7) to steps (1) and (4);

(9) distilling the hydrocarbons recovered in step (7) and recovering an overhead stream of principally ethane and a substantial proportion of propane and a bottom stream of the heavier hydrocarbons; and

(10) passing the overhead stream of step (9) to step (5) as the feed stream thereto.

3. An apparatus comprising, in operable combination, a first absorption vessel having inlets for feed gas and lean absorbent and outlets for off-gas and rich absorbent, an upright deethanizer-absorber vessel having an upper absorption section and a lower stripping section leading directly into and continuous with said upper section, said absorption section having an off-gas outlet and a lean oil inlet at its upper end and a feed inlet at a level of about a mid-elevation thereof, an inlet for rich absorption oil in the upper portion of said stripping section in communication with the rich oil outlet of said absorption vessel, a kettle section and an outlet for kettle product in the lower end portion of said stripping section, a stripping still and a deethanizing still, each still having an overhead vapor outlet, a kettle section, kettle product outlet, and a feed inlet, the kettle product outlet of said stripping section being in communication with the feed inlet of said stripping still, the vapor outlet of said stripping still being in communication with the feed inlet of said deethanizing still, the kettle outlet of said stripping still being in communication with the lean absorbent inlet of each of said absorption vessel and said absorption section, a conduit communicating the vapor outlet of said deethanizing still with the feed inlet of said absorption section, said conduit being provided with cooling means for producing condensate reflux and heating means intermediate said cooling means and said absorption section for heating the fluid flowing in said conduit, and means for returning condensate reflux from said cooling means to said deethanizing still.

References Cited by the Examiner

UNITED STATES PATENTS

| | | | |
|---|---|---|---|
| 2,265,845 | 12/1941 | Kuhl | 55—93 X |
| 2,277,387 | 3/1942 | Carney | 55—51 X |
| 2,288,453 | 6/1942 | Hill | 55—56 X |
| 2,313,196 | 3/1943 | Guinot | 55—84 X |
| 2,468,750 | 5/1949 | Gudenrath | 55—51 X |
| 2,573,341 | 10/1951 | Kniel | 55—40 X |
| 2,675,095 | 4/1954 | Bogart | 55—93 |
| 2,727,588 | 12/1955 | Woertz | 55—88 |
| 2,729,588 | 1/1956 | Hannah | 55—56 X |
| 2,804,939 | 9/1957 | Mattix | 55—56 X |
| 2,849,371 | 8/1958 | Gilmore | 55—40 |
| 3,060,662 | 10/1962 | Parsons et al. | 55—43 X |

REUBEN FRIEDMAN, *Primary Examiner.*